United States Patent
Downing

[19]

[11] Patent Number: 6,113,509
[45] Date of Patent: Sep. 5, 2000

[54] DIFFERENTIAL PLANETARY BELT DRIVE SYSTEM

[75] Inventor: Steven P. Downing, Camas, Wash.

[73] Assignee: Hewlett-Packard Company, Palo Alto, Calif.

[21] Appl. No.: 09/294,773

[22] Filed: Apr. 19, 1999

[51] Int. Cl.[7] .................................................. F16H 7/00
[52] U.S. Cl. ........................................ 474/86; 474/88
[58] Field of Search .............................. 474/69, 71, 72, 474/73, 84, 86, 87, 88, 89, 148

[56] References Cited

U.S. PATENT DOCUMENTS

| | | | |
|---|---|---|---|
| 4,952,201 | 8/1990 | Winsko et al. | 474/89 |
| 5,683,320 | 11/1997 | Friesen et al. | 474/86 |
| 5,730,672 | 3/1998 | Lin | 474/88 |
| 5,830,094 | 11/1998 | DeNijs | 474/88 |
| 5,832,703 | 11/1998 | Evans | 474/88 |
| 5,909,075 | 6/1999 | Heimark | 474/86 |

*Primary Examiner*—David Fenstermacher
*Assistant Examiner*—Matthew A. Kaness

[57] ABSTRACT

A media advance system is driven using a fixed-differential, planetary belt drive system. Planetary pulleys, mounted to a mounting structure, orbit a motor shaft as the mounting rotates about the motor shaft. A first planetary pulley is coupled by a drive belt to a fixed pulley. The fixed pulley does not rotate and is aligned to the motor shaft, so the planetary pulley is forced to rotate while orbiting. A second planetary pulley rotates and orbits with the first. An output pulley is coupled to the second planetary pulley by another drive belt. An output shaft is coupled to the output pulley. Drive ratio of the output shaft to the motor shaft is based upon the diameters of the fixed pulley, first planetary pulley, second planetary pulley, and output pulley. Noise is low by using belts rather than meshing gears. Variable differentiation is achieved in another embodiment.

24 Claims, 5 Drawing Sheets

DIFFERENTIAL PLANETARY BELT DRIVE SYSTEM

BACKGROUND OF THE INVENTION

This invention relates generally to drive systems, and more particularly, to a drive system with improved acoustic qualities. In one implementation a reduced-noise media drive system is provided for an office machine, such as a printer, copier, telecopier, scanner or the like. Other systems using a drive system also may benefit from the invention.

Conventionally, office machines which move a media sheet to receive print recording or scanning use gear train speed reductions for media advance. For every one rotation of a drive motor shaft there are x rotations of a media roller (where x typically is less than 1), as determined by the gear train reductions. For drive systems using open loop stepper motors, gear quality is important for accurate media advance. To further improve accuracy and precision, encoders may be used on the media roller's drive shaft. Another solution for improving accuracy and precision has been to use DC servo motors, instead of the open loop stepper motors.

For desktop products it is desirable that systems occupy little desk space and have minimal cost. Further, the media must advance fast enough to meet system throughput requirements. As a result, gear trains have been used which have high velocity and high tooth meshing frequencies. However, such approach to increasing speed is accompanied by an increase in noise. As system requirements continue to call for increasingly high speeds, the increasingly high tooth meshing frequencies result in systems exceeding desired acoustical limits. Accordingly, there is a need for a quieter drive system which can achieve desired media advance velocities without compromising advance accuracy or precision.

SUMMARY OF THE INVENTION

According to the invention, a media advance system is driven using a fixed-differential, planetary drive system. Rather than have gears meshing, the drive system includes pulleys coupled with belts. The drive system includes a drive motor, a mounting structure, a fixed pulley, at least first and second planetary pulleys, one or more output pulleys and a plurality of drive belts. The drive motor has a motor shaft onto which is secured the mounting structure. The planetary pulleys are mounted to the mounting structure along one or more respective axles. The one or more output pulleys are coupled to the planetary pulleys by drive belts. Drive differentiation is obtained by using planetary pulleys and output pulleys of differing diameter, and correspondingly, using drive belts of differing length.

According to one aspect of the invention, the mounting structure rotates with the motor shaft. As the mounting structure rotates, the planetary pulleys revolve (i.e., orbit) around the motor shaft in planetary fashion. As each planetary pulley revolves, it also rotates about its respective axle.

According to another aspect of the invention, the fixed pulley is coupled to the first planetary pulley by a drive belt. In some embodiments, the first and second planetary pulleys are formed as a unitary structure mounted on a single axle. The fixed pulley is fixedly mounted, so as not to rotate. The fixed pulley has a center point coaxially aligned with the motor shaft. In some embodiments the fixed pulley is mounted concentric to the motor shaft. In other embodiments, the fixed pulley is mounted distal to the motor shaft, (although still aligned with the motor shaft axis).

According to another aspect of this invention, in a single stage embodiment the output pulley is coupled to the second planetary pulley by another drive belt. The rotating and revolving action of the second planetary pulley rotates the output pulley. An output shaft is coupled directly to the output pulley. A load, such as a media advance roller, is driven by the output shaft. In a multiple stage embodiment, a set of intermediary pulleys are included for each additional stage. An intermediary pulley is coupled to the second planetary pulley. In the last stage, another intermediary pulley is coupled to the output pulley. The last stage is coupled to the output shaft which drives the load.

According to another aspect of the invention, the fixed pulley provides a reference for the rotation of the first planetary pulley and the differential drive of the output shaft. As the mounting structure rotates about the motor shaft, the first planetary pulley and second planetary pulley rotate with it. Because the first planetary pulley is coupled to the fixed pulley by a drive belt, the first planetary pulley is forced to rotate during its revolutionary orbit. The orbiting speed of revolution equals the motor shaft speed. The speed of rotation depends on the motor shaft speed and the relative diameters of the fixed pulley and first planetary pulley. The second planetary pulley shares a common axle with the first planetary pulley, so the second planetary pulley also is forced to rotate as it orbits. Because the first planetary pulley and second planetary pulley share a common axle, the rotational speed of the second planetary pulley is the same as that of the first planetary pulley.

In a single stage embodiment, because the output pulley is coupled to the second planetary pulley, it too is forced to rotate. The speed of rotation of the output pulley is determined by the speed of rotation of the second planetary pulley, and the relative diameters of the second planetary pulley and the output pulley. The output shaft is driven by the output pulley, either directly or indirectly. A fixed-differential drive of the output shaft is achieved in which the differential from the motor shaft to the output shaft is based upon the diameters of the fixed pulley, the first planetary pulley, the second planetary pulley, and the output pulley. In multiple-staged drive system, further differentiation is achieved by the intermediary pulleys.

According to another aspect of the invention, the mounting structure serves as a balanced load for the motor shaft. In one embodiment, the mounting structure is an elongated structure mounted to the motor shaft at a point away from an endpoint, preferably at a midpoint. The elongated structure therefore has a first section and a second section which are parallel and coextensive, and which originate from the area around the motor shaft. The first planetary pulley and second planetary pulley are coupled to the elongated structure along the first section. A counter-balance is mounted to the elongated structure along the second section. In some embodiments the counter-balance is formed by one or more other planetary pulleys. The counter-balance serves to reduce or eliminate a bending torque on the motor shaft which is attributable to the rotating structure.

In other embodiments, the mounting structure has a plurality of arms extending from a common center, in which the center is secured to the motor shaft. In still other embodiments, the mounting structure has a triangular, square, circular or other shape along its periphery, and again is secured to the motor shaft at the center of the mounting structure. The planetary pulleys are mounted to the mounting structure at one or more points. To eliminate or reduce a bending torque on the motor shaft, planetary pulleys and one ore more counter-balance structures are mounted about the mounting structure at strategic locations.

One advantage of the invention is that large and versatile drive differentiation of the output shaft is achieved. Specifically, a large differential ratio is achieved between the motor shaft and the output shaft in as little as one stage. In an example described below a differential ratio of over 200:1 is achieved in one stage. This is a significant advantage over, for example, a non-planetary belt drive system which achieves about a 5:1 gear ratio per stage.

Further, a versatile drive differential ratio may be achieved using the drive belts. In the belt drive system of this invention, the size of the pulleys or the number of teeth in a timing belt may be changed with little restriction, as compared to a pitch diameter limitation of a planetary gear system. (In a planetary gear system, the sum of the pitch diameter of gears on the input side of a stage must equal the sum of the pitch diameter on the output side). As a result, systems can be implemented according to the invention having a wide range of differential ratios. In an example described below, any differential ratio between −224:1 to +225:1 may be achieved. The specific ratios are cited just for example and may span a smaller or larger range in other examples. Accordingly, there are more differential drive ratio possibilities in the system of this invention, compared to gear ratio possibilities in a planetary gear system of the same number of stages. Versatile drive differentiation of the output shaft is achieved while maintaining accurate media advance at increasingly faster throughput speeds.

Another advantage of the invention is that the rotating pulleys and drive belts make less noise than meshing gears. As a result, system acoustical noise levels are reduced. System acoustical noise level is further reduced by the damping effect of the drive belt on motor vibrations and noise. Rather than have the motor vibrations and noise translated through gears into the drive mechanisms, the drive belt provides a degree of isolation. The isolation is further effected by isolating the motor from the system chassis using an isolation surface.

According to another aspect of the invention, the system may be configured to drive an output shaft in an oscillating output motion. In such a system, a set of pulleys along a common drive belt are eccentrically mounted. In one embodiment, the fixed pulley and the corresponding planetary pulley coupled to the fixed pulley by a drive belt are eccentrically mounted. In another embodiment, the output pulley and the corresponding planetary pulley coupled to the output pulley by a drive belt are eccentrically mounted. In some embodiments multiple stages are implemented. For example, an oscillation frequency slower than motor rotation frequency is achieved in a system in which a first stage is a fixed-differential belt-driven stage (or a conventional gear reduction stage). The second stage is the oscillatory variable-differential belt-driven stage (e.g., output pulley and corresponding planetary pulley are eccentrically mounted). An advantage of the oscillatory output system is that rapid acceleration and varying direction are achieved without engagement and disengagement of a gear train. This invention reduces system noise and drive system wear.

These and other aspects and advantages of the invention will be better understood by reference to the following detailed description taken in conjunction with the accompanying drawings.

DESCRIPTION OF SPECIFIC EMBODIMENTS

Overview

Figure 1:
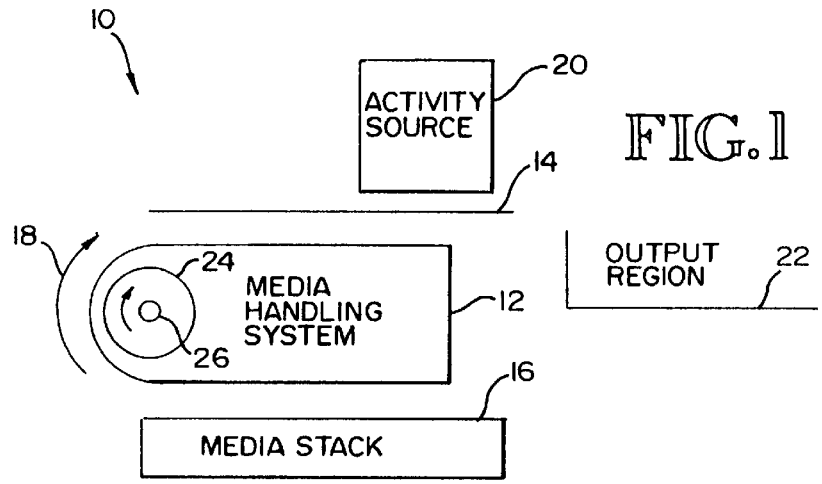
FIG. 1 is a block diagram of a host system, including a media handling subsystem.

FIG. 1 shows a host system 10 for acting upon a media sheet 14. In one embodiment the host system 10 is a print recording system, such as an inkjet recording system or laserjet recording system implementing a printer or the print recording portion of a copier or telecopier device. In another embodiment the host system 10 is a scanning system, such as an optical scanner or a scanning portion of a copier or telecopier. The host system 10 includes a media handling system 12. A media sheet 14 is fed directly or from a media stack 16 along a media path 18 by the media handling subsystem 12 to an activity source 20. The activity source 20 acts upon the media sheet 14. The media path 18 then ends beyond the activity source 20 in an output region 22, where the media sheet 14 comes to rest. In one embodiment the activity source 20 is a print source, such as an inkjet printing cartridge or a laserjet printing cartridge or some other print recording device. In another embodiment, the activity source 20 is a print scanning source such as an optical scanner. The print source records characters, graphics or other symbols or images on the media sheet. The print scanning source scans the media sheet to detect characters, graphics or other symbols or images on the media sheet.

The media handling system 12 includes at least one drive roller 24 which advances the media sheet 14 along the media path 18. The roller 24 includes a roller shaft 26. FIGS. 2 and 4–7 show various embodiments of a fixed-differential planetary belt drive system included in the media handling system 12. For each embodiment the load of the drive system is the roller shaft 26.

Figure 2:
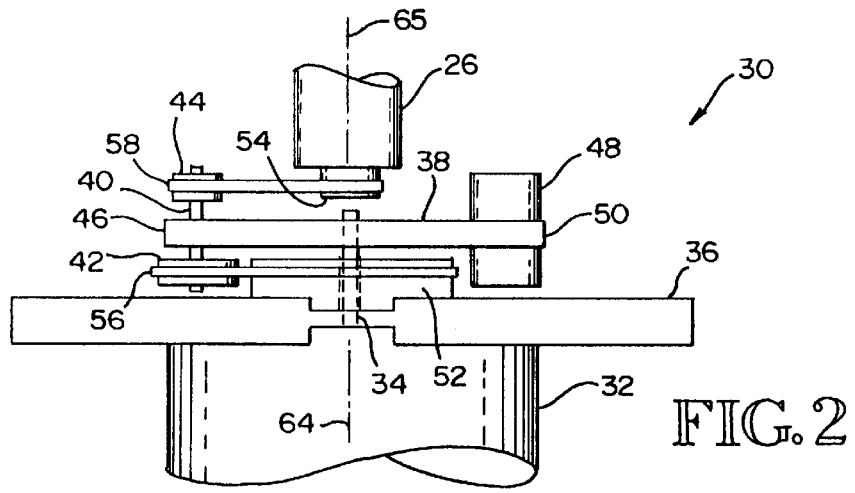
FIG. 2 is a diagram of a fixed-differential, planetary, belt drive system according to one embodiment of this invention.
Figure 3:
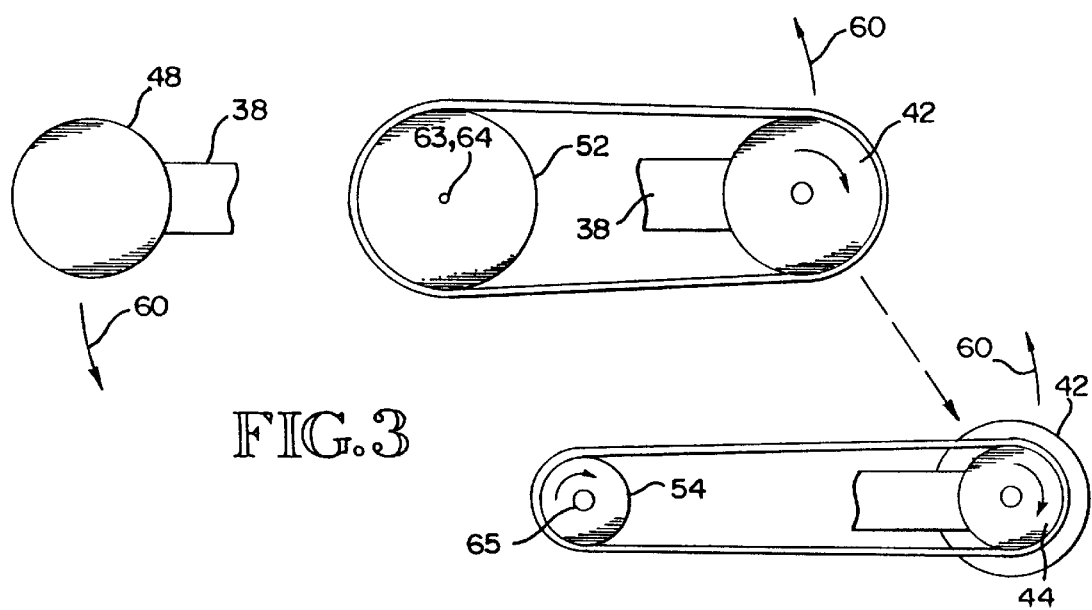
FIG. 3 is a diagram of the first planetary pulley revolving about the fixed pulley, and of the output pulley rotating relative to the second planetary pulley.
Figure 4:
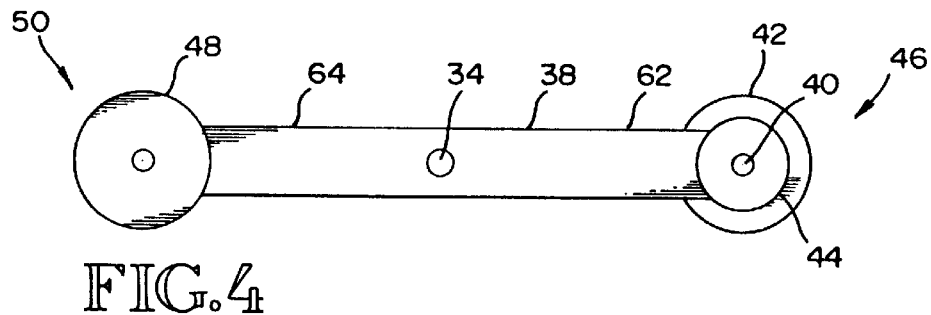
FIG. 4 is a planar view of a mounting structure embodiment.

Referring to FIGS. 2–4, a fixed-differential, planetary, belt drive system 30 includes a drive motor 32 having a drive shaft 34. The motor 32 is either an open loop stepper motor, a servo controlled motor or another motor suitable for use in office machines, such as printers, copiers, telecopiers and the like. The motor 32 is mounted to a housing or other surface 36. Mounted or otherwise secured to the drive shaft 34 is a mounting structure 38. An axle 40 carrying a first planetary drive pulley 42 and a second planetary drive pulley 44 is mounted toward one end 46 of the mounting structure 38. A counter-balance structure 48 is mounted toward an opposite end 50 of the mounting structure 38. The mounting structure 38 is fixed relative to the motor shaft 34, and thus, rotates with the motor shaft 34. The structure 38 is made of steel, hard plastic or another rigid material. The axle 40 is freely mounted or mounted with bearings to allow the axle 40 to freely spin relative to the mounting structure 38.

Figure 7:
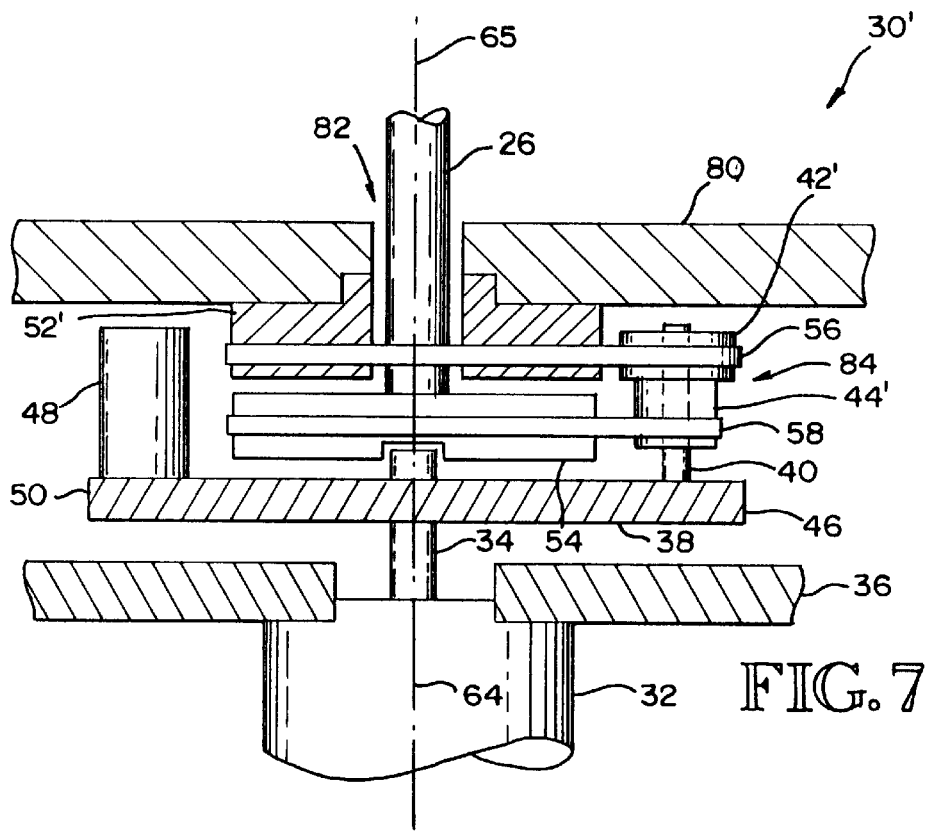
FIG. 7 is a diagram of a fixed-differential, planetary, belt drive system according to another embodiment of this invention.
Figure 8:
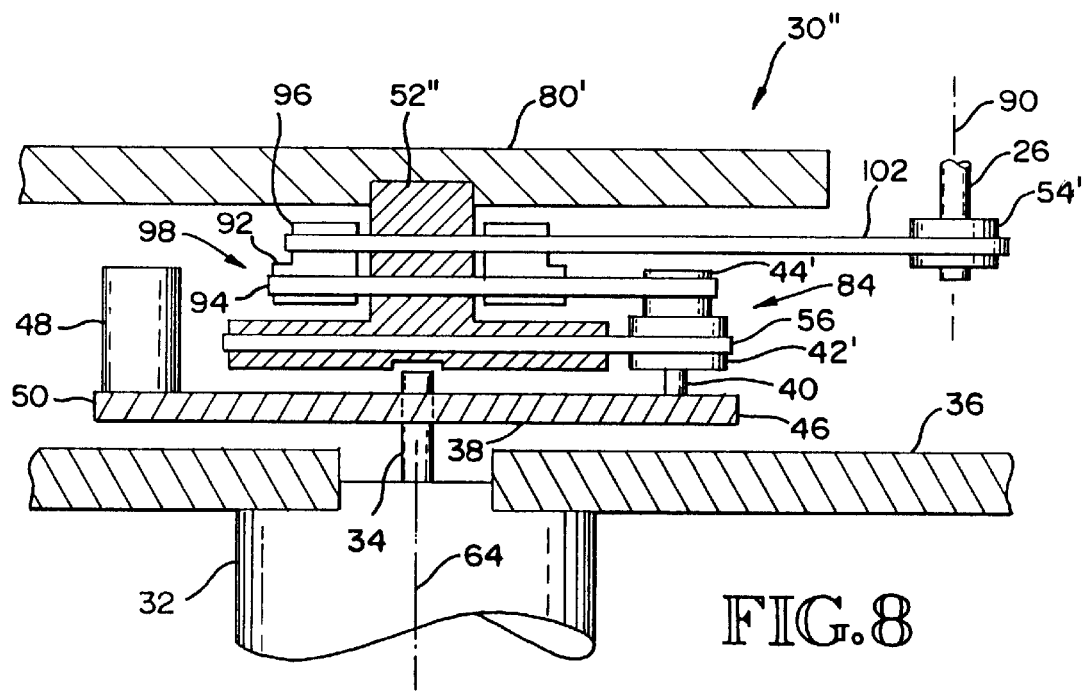
FIG. 8 is a diagram of a fixed-differential, planetary, belt drive system according to another embodiment of this invention.
Figure 9:
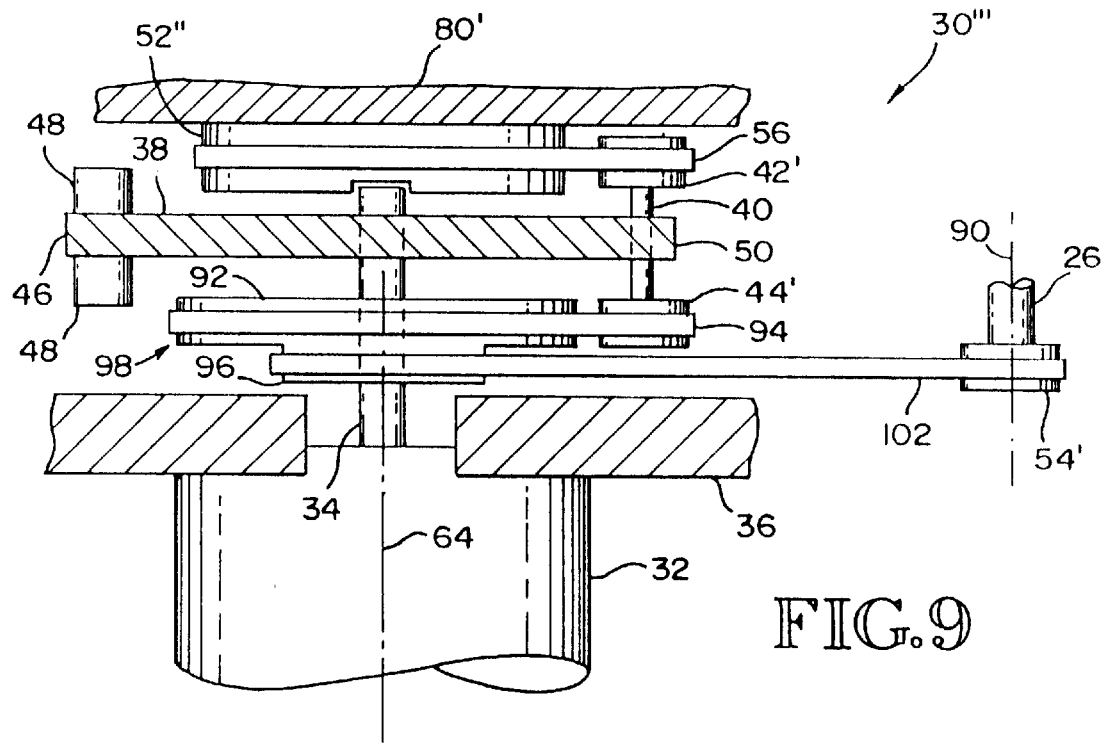
FIG. 9 is a diagram of a fixed-differential, planetary, belt drive system according to another embodiment of this invention.

Also included with the drive system 30 is a fixed pulley 52, an output pulley 54 and a plurality of drive belts 56, 58. The first planetary pulley 42 is coupled to the fixed pulley 52 by the drive belt 56. The fixed pulley 52 does not rotate and is mounted in a position which is fixed relative to the motor 32. More specifically, the fixed pulley 52 has a center point 63 which is aligned along the axis 64 of the motor shaft 34. In some embodiments the fixed pulley is mounted concentric to the motor shaft (as shown in FIG. 2). In other embodiments, the fixed pulley is mounted distal to the motor shaft, (although still aligned with the motor shaft axis), as shown in FIGS. 7–9).

The second planetary pulley 44, also located along axle 40, is coupled to the output pulley 54 by drive belt 58. An output shaft, such as the roller shaft 26, is coupled to the output pulley 54. In the embodiment of FIG. 2 the output shaft 26 is fixed relative to the output pulley 54. In the embodiment of FIG. 2 the axis 65 of the output pulley 54 is aligned with the axis 64 of motor shaft 34.

In various embodiment the drive belts 56, 58 are timing belts, V-belts, O-rings, cables, metal bands or another belt-type power transmission component. In one embodiment, the belt is a toothed timing belt and the related pulleys 42, 44, 52, 54 are toothed pulleys, wherein the teeth of the timing belt mesh with the teeth of the pulley. Preferably the timing belt teeth are made from rubber, plastic, or another material which has desirably low acoustical noise impact on the system 10 when meshing with the pulley teeth. In some embodiments the teeth of the pulleys are made from rubber, plastic (e.g., polyurethane), metal or another material which has desirably low acoustical noise impact on the system 10 when meshing with the timing belt.

In operation, the motor 32 spins the motor shaft 34, causing the mounting structure 38 to rotate with the motor shaft 34. As the mounting structure 38 rotates, the first planetary pulley 42 and second planetary pulley 44 coupled to the structure 38 by axle 40 rotate with the structure 38. Thus the planetary pulleys 42, 44 orbit about the motor shaft 34. Depending on the relative diameters of the pulleys 42, 52, the planetary pulley 42 either rotate or does not rotate while orbiting. Rotation may be in either direction, clockwise or counter-clockwise. Rotation or non-rotation is defined relative to pulley 42's axis and an absolute plane (i.e., plane of the fixed pulley 52). It is because the first planetary pulley 42 is coupled to the fixed pulley 52 by a drive belt 56, that the first planetary pulley 42 may be forced to rotate about its axis during orbit. The fixed pulley 52, being stationary and not rotating, serves as a reference for the rotation of the first planetary pulley 42. FIG. 3 shows the first planetary pulley 42 and the opposing counter-balance structure 48 orbiting along path 60 about the fixed pulley center 63 and axis 64. The counter-balance 48 serves to balance a bending torque on the motor shaft attributable to the moment arm created by orbiting pulleys 42, 44.

Because the second planetary pulley 44 shares the same axle 40 as the first planetary pulley 42, the second planetary pulley 44 is forced to rotate or remain in non-rotation with the first planetary pulley 42, as the second planetary pulley 44 orbits the motor shaft 34. In this embodiment it is the axle 40 which rotates or does not rotate relative to the absolute plane (of the fixed pulley 52). The pulleys 42,44 are stationary relative to the axle 40 and relative to each other. The speed of rotation of pulleys 42, 44 on axle 40 depends on the motor shaft 34 speed and the diameters of the fixed pulley 52, and first planetary pulley 42.

Because the output pulley 54 is coupled to the second planetary pulley 44 by belt 58, it too may be forced to rotate (see FIG. 3). It may be forced to rotate in one direction (clockwise), or another direction (counter-clockwise), or remain in non-rotation (relative to the absolute plane of fixed pulley 52) depending on the relative diameters of the output pulley 54, the secondary planetary pulley 44, the fixed pulley 52 and the first planetary pulley 42. The speed of rotation of the output pulley 54 is determined by the speed of rotation of the second planetary pulley 44 and the relative diameters of the second planetary pulley 44 and the output pulley 54.

The output shaft 26 is driven by the output pulley 54, either directly or indirectly. A fixed-differential, output drive of the output shaft 26 is achieved based upon the selections of the diameters for the fixed pulley 52, the first planetary pulley 42, the second planetary pulley 44, and the output pulley 54. In the single stage implementation shown in FIG. 2, the motor shaft to output shaft turn ratio is defined by the following equation:

$$\frac{1}{1 - ((d_{fp} * d_{spp})/(d_{fpp} * d_{op}))}$$

where, $d_{fp}$=diameter of the fixed pulley;
$d_{spp}$=diameter of the second planetary pulley;
$d_{fpp}$=diameter of the first planetary pulley; and
$d_{op}$=diameter of the output pulley.

For an embodiment in which toothed timing belts and toothed pulleys are used (and teeth are the same size), the number of teeth on a given pulley can be substituted for the diameter of such pulley. When using a toothed belt meshing with teeth of a pulley, the number of teeth impact the potential range of differentiation achieved between the motor shaft 34 and output shaft 26.

Note that $(d_{fp}*d_{spp})/(d_{fpp}*d_{op})$ may be less than one, greater than one, or equal to one. If less than one, the output pulley 54 and output shaft 26 rotate in one direction. If greater than one, the output pulley 54 and output shaft 26 rotate in the opposite direction. If equal to one, the output pulley 54 and output shaft 26 are stationary.

Although the differential drive ratio is fixed for a given set of pulleys, different specimens of the embodiment of FIG. 2 may use different pulleys. If for example, the potential pulleys include 13, 14, 15, 16 or 18 teeth, then various combinations of these choices allow for 131 different differential drive ratios (e.g., similar to gear ratios). The potential differential drive ratios are 1:1 to 225:1 and −1:1 to −224:1. For example, a differential drive ratio of 40:1 is achieved by using a fixed pulley 52 with 18 teeth, a first planetary pulley with 16 teeth, a second planetary pulley with 13 teeth and an output pulley with 15 teeth. For smooth belt embodiments, the diameters of the pulleys may vary in a continuous manner from specimen to specimen. Thus, any desired differential ratio is achievable. This contrasts significantly with a planetary gear drive system in which the selection of the number of teeth are limited according to the constriction that the sum of the pitch diameters on the input side be equal to the sum of the pitch diameters on the output side of a given stage.

Alternative Embodiments—Mounting Structure 38

FIG. 4 shows an elongated mounting structure 38 mounted to the motor shaft 34 toward a midpoint of the structure 38. The elongated structure 38 has a first section 62 and a second section 64 which are parallel and coextensive, and which originate from the area around the motor shaft 34. Toward one end 46 of the structure 38 along first section 62 is an axle 40. The first planetary pulley 42 and the second planetary pulley 44 are mounted to the axle 40. Toward the opposite end 50 of the structure 38 along second section 64 is the counter-balance 48. In some embodiments the counter-balance is formed by one or more other pulleys. The counter-balance 38 serves to reduce or eliminate a bending torque on the motor shaft 34 which is attributable to the rotating structure 38. In the embodiment in which a set of pulleys is located at each end of the elongated structure, each set of pulleys drives a separate output (see FIG. 10). Further, the set of pulleys at one end serves as a counter-balance to the set of pulleys at the other end, while the set of pulleys at such other end serves as a counter-balance to the set of pulleys at the first end.

Figure 5:
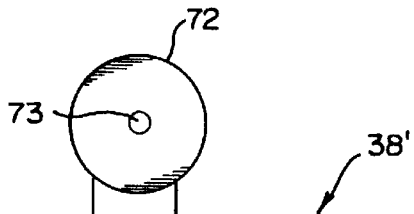
FIG. 5 is a planar view of another mounting structure embodiment.
Figure 5:
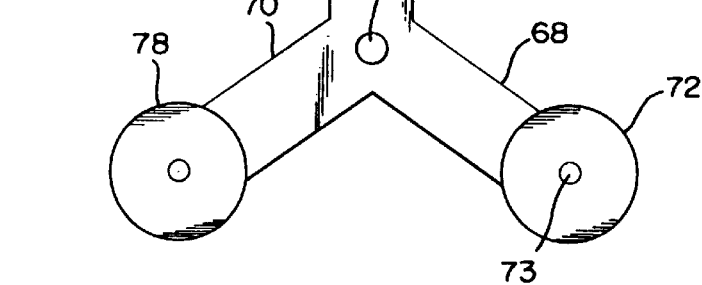

In alternative embodiments the mounting structure carries more than two sets of planetary pulleys/counterbalances. Referring to FIG. 5, mounting structure 38' includes three sections 66, 68, 70 which originate from a common center around motor shaft 34. Toward the respective end of each section are mounted a pair of planetary pulleys 72 or a counter-balance 78. Illustrated are two sets of pulleys and a counter-balance. Such embodiment may vary to have three sets of planetary pulleys in which each set of planetary pulleys serves as a counter-balance to the other two sets. Alternatively, the embodiment may vary to include one set of planetary pulleys and two counter-balances. Each pair of planetary pulleys 72 are free to rotate relative to a pulley axis 73. One pulley out of a given pair of planetary pulleys is coupled by a drive belt to the fixed pulley 52. The other pulley of the given pair of planetary pulleys is coupled to a corresponding output pulley. There may be a separate output driven for each pair of planetary pulleys. Note that in some embodiments the pair of planetary pulleys are integrally or otherwise formed as one unitarily-moving structure.

Figure 6:
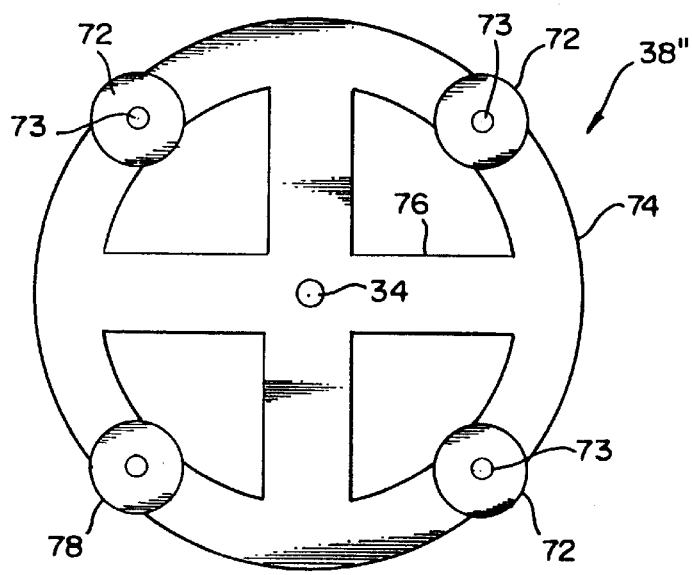
FIG. 6 is a planar view of another mounting structure embodiment.

FIG. 6 shows another alternative embodiment in which the mounting structure 38" includes a peripheral portion 74 and an inner frame portion 76. The mounting structure 38" is mounted to the motor shaft 34 toward the structure's center. One or more pairs of planetary pulleys 72 are mounted to the peripheral portion 74. Each pair of planetary pulleys 72 is free to rotate relative its respective pulley axis 73. Illustrated are four placement positions. Each position may be occupied by a pair of pulleys 72 or a dedicated counter-balance 78. Note, however, that each pair of pulleys 72 also serves as a counter-balance for the other pairs of pulleys 72. Thus, there may be zero or more dedicated counter-balances 78 mounted to the peripheral portion 74. The pairs of pulleys 72 and counter-balances are located in symmetrical fashion along the peripheral portion 74 to balance the mounting structure 38", and reduce or eliminate a bending torque on the motor shaft 34, attributable to the rotating mounting structure 38".

Although the peripheral portion 74 is shown to be circular and the frame portion 76 is shown to be a cross, the shapes may vary. The peripheral portion 74 may be triangular, square, or another geometrically shaped or radially-symmetrically shaped structure. The frame portion may have spokes, as shown, or not. In addition the peripheral portion 74 and frame portion 76 may together form a plate, which is solid or has openings.

For each of the embodiments of FIGS. 4, 5 and 6, one set of pulleys 72 may rotate in the same or opposite direction of the other sets of pulleys on the same mounting structure 38, 38', 38". Further, one or more sets of pulleys 72 may be non-rotating (relative to the absolute plane of the fixed pulley) while orbiting. Although the direction of rotation may vary for a given set or sets of pulleys 72, the orbiting direction is the same for each set of pulleys 72. The mounting structure motion defines the orbiting direction. The pulley axis motion relative to the mounting structure defines the rotational direction.

Alternative Embodiments—Fixed Pulley Distal to Motor Shaft

Referring to FIG. 7, an embodiment of a fixed-differential planetary belt drive system 30' is shown in which the fixed pulley 52' is located distal to the motor shaft 34, rather than concentric to the motor shaft 34. Although distal to the motor shaft, the fixed pulley 52' center is still aligned with the motor shaft axis. Components which are the same or similar to those described with respect to drive system 30 of FIG. 2 are given the same part numbers and have the same functions.

The fixed pulley 52' is fixedly mounted to a plate 80 or another surface which is stationary relative to the surface 36 to which the motor 32 is mounted. The fixed pulley includes an opening 82 at its center through which passes the output shaft 26. The surface 80 also includes an opening which allows the output shaft 26 to pass to a given load. In some embodiments bearings are included to enable smooth rotation of the output shaft within the opening of the fixed pulley 52' and surface 80. Also shown is a unitary structure 84 which includes one portion of one diameter which serves as the first planetary pulley 42' and another portion of the same or other diameter which serves as the second planetary pulley 44'.

In operation, the motor 32 spins the motor shaft 34, causing the mounting structure 38 to rotate with the motor shaft 34. As the mounting structure 38 rotates, the first planetary pulley 42' and second planetary pulley 44' coupled to the structure 38 by axle 40 rotate with the structure 38. Thus the planetary pulleys 42', 44' orbit about the motor shaft 34. Because the first planetary pulley 42' is coupled to the fixed pulley 52' by a drive belt 56, the first planetary pulley 42' is forced to rotate on axle 40 during its orbit. The fixed pulley 52', being stationary and not rotating, serves as a reference for the rotation of the first planetary pulley 42'.

Because the second planetary pulley 44' is part of the same unitary structure 84 as the first planetary pulley 42, the second planetary pulley 44' also rotates as it orbits the motor shaft 34. The speed of rotation of pulleys 42', 44' on axle 40 depends on the motor shaft 34 speed and the diameters of the fixed pulley 52', and first planetary pulley 42'.

Because the output pulley 54 is coupled to the second planetary pulley 44' by belt 58, it too is forced to rotate. The speed of rotation of the output pulley 54 is determined by the speed of rotation of the second planetary pulley 44' and the relative diameters of the second planetary pulley 44' and the output pulley 54. The output shaft 26 is driven by the output pulley 54, either directly or indirectly. A fixed-differential, output drive of the output shaft 26 is achieved based upon the selections of the diameters for the fixed pulley 52', the first planetary pulley 42', the second planetary pulley 44', and the output pulley 54. (See equation above as described for the principal embodiment).

Alternative Embodiments—Offset Output Shaft

In the embodiments of FIGS. 2 and 7, the output shaft 26 is aligned with the motor shaft 34 along a common axis 64. Referring to FIG. 8, an embodiment of a fixed-differential planetary belt drive system 30" is shown in which an axis 90 of the output shaft 26 is offset relative to the axis 64 of the motor shaft 34. Like in the FIG. 7 embodiment, the fixed pulley 52" is located distal to the motor shaft 34, and has a center point along the axis 64 of the motor shaft 34. Components which are the same or similar to those described with respect to drive systems 30, 30' are given the same part numbers and have the same functions.

The motor 32 is mounted to a housing or other surface 36. Mounted or otherwise secured to the drive shaft 34 is the mounting structure 38. An axle 40 carrying the first planetary pulley 42' and a second planetary pulley 44' is mounted toward one end 46 of the mounting structure 38. A counterbalance structure 48 is mounted toward an opposite end 50 of the mounting structure 38. The mounting structure 38 is fixed relative to the motor shaft 34, and rotates with the motor shaft 34.

The first planetary pulley 42 is coupled to the fixed pulley 52" by the drive belt 56. The fixed pulley 52" does not rotate and is fixedly mounted to surface 80'. Surface 80' is stationary relative to surface 36. The second planetary pulley 44', also located along axle 40, is coupled to a first intermediary pulley 92 by a drive belt 94. A second intermediary pulley 96 is connected to first intermediary pulley 92. In one embodiment the first and second intermediary pulleys 92, 96 are formed as a unitary structure 98 and rotate as one. In the embodiment of FIG. 8 the unitary structure 98 rotates about a portion adjacent to or part of the fixed pulley 52". In some embodiments bearings are included to enable smooth rotation. In other embodiments, the use of a plastic material allows the structure 98 to rotate freely concentric to the fixed pulley 52" or a portion of such pulley 52". The output pulley 54' is coupled to the second intermediary pulley 96 by a drive belt 102. The output shaft 26 is coupled to the output pulley 54.

In operation, the motor 32 spins the motor shaft 34, causing the mounting structure 38 to rotate with the motor shaft 34. As the mounting structure 38 rotates, the first planetary pulley 42' and second planetary pulley 44' coupled to the structure 38 by axle 40 rotate with the structure 38. Thus the planetary pulleys 42', 44' orbit about the motor shaft 34. Because the first planetary pulley 42' is coupled to the fixed pulley 52" by the drive belt 56, the first planetary pulley 42' is forced to rotate on axle 40 during its orbit. The fixed pulley 52", being stationary and not rotating, serves as a reference for the rotation of the first planetary pulley 42'. Because the second planetary pulley 44' moves in unison with the first planetary pulley 42', the second planetary pulley 44' also rotates as it orbits the motor shaft 34. The speed of rotation of pulleys 42', 44' depends on the motor shaft 34 speed and the diameters of the fixed pulley 52", and first planetary pulley 42'.

Because the first intermediary pulley 92 is coupled to the second planetary pulley 44 by belt 94, it too is forced to rotate. The second intermediary pulley 96 rotates with the first intermediary pulley 92. Because the output pulley 54' is coupled to the second intermediary pulley 96 by belt 102, it too is forced to rotate. The speed of rotation of the output pulley 54' is determined by the speed of rotation of the second intermediary pulley 96 and the relative diameters of the second intermediary pulley 96 and the output pulley 54'. The output shaft 26 is driven by the output pulley 54', either directly or indirectly. A fixed-differential, output drive of the output shaft 26 is achieved based upon the selections of the diameters for the fixed pulley 52", the first planetary pulley 42', the second planetary pulley 44', the first intermediary pulley 92, the second intermediary pulley 96, and the output pulley 54'.

FIG. 9 shows another embodiment 30'" in which the output shaft 26 is offset relative to the axis 64 of the motor shaft 34. This embodiment is similar to the FIG. 8 embodiment but has the intermediary pulleys 92', 96' rotate concentric to the motor shaft 34, rather than concentric to the fixed pulley 52". Components which are the same or similar to those described with respect to drive systems 30, 30', 30" are given the same part numbers and have the same functions.

Alternative Embodiments—Additional Outputs

Figure 10:
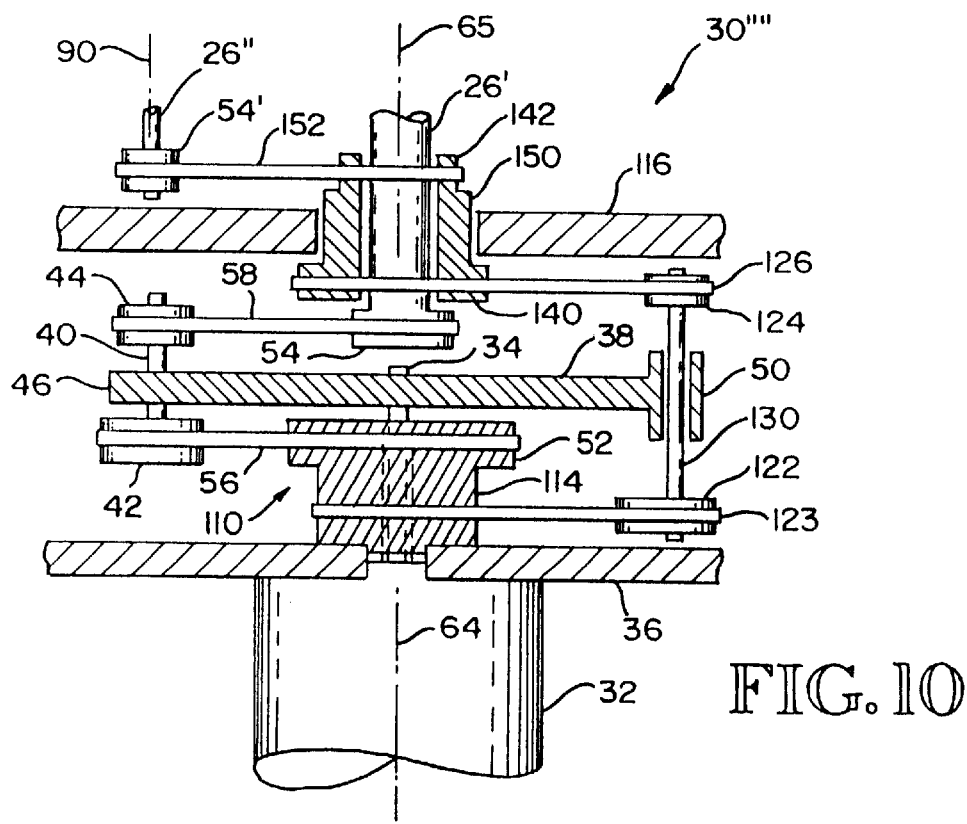
FIG. 10 is a diagram of a fixed-differential, planetary, belt drive system according to another embodiment of this invention.

Referring to FIG. 10, a fixed-differential, planetary, belt drive system 30"" drives two output shafts 26', 26". Components which are the same or similar to those described with respect to drive systems 30, 30', 30" or 30'" are given the same part numbers and have the same functions.

The drive system 30"" includes the drive motor 32 having the drive shaft 34. The motor 32 is mounted to the surface 36. Mounted or otherwise secured to the drive shaft 34 is the mounting structure 38. Toward one end 46 of the structure 38 is the axle 40 which carries the first planetary pulley 42 and the second planetary pulley 44. Toward an opposite end 50 is another axle 130 which carries another pair of planetary pulleys—a third planetary pulley 122 and a fourth planetary pulley 124. The mounting structure 38 is fixed relative to the motor shaft 34, and thus, rotates with the motor shaft 34. The axles 40, 130 are freely mounted or mounted with bearings to allow the axles to freely spin relative to the mounting structure 38.

Like for the system 30 of FIG. 2, the first planetary pulley 42 is coupled to the fixed pulley 52 by a drive belt 56. The fixed pulley 52 does not rotate and is mounted in a position which is fixed relative to the motor 32. More specifically, the fixed pulley 52 has a center point which is along the axis 64 of the motor shaft 34. In the embodiment illustrated, the fixed pulley 52 is concentric to the motor shaft 34. The second planetary pulley 44, also located along axle 40, is coupled to a first output pulley 54 by drive belt 58. An output shaft 26' is coupled to the output pulley 54. In the embodiment of FIG. 10 the output shaft 26' is fixed relative to the output pulley 54. Also the axis 65 of the output pulley 54 is aligned with the axis 64 of motor shaft 34.

The output shaft 26' is one output driven by the system 30"". The system 30"" also includes a second fixed pulley 114, first and second intermediary pulleys 140, 142, and a second output pulley 54', which with the third planetary pulley 122 and fourth planetary pulley 124 drive the second output—i.e., output shaft 26". The first fixed pulley 52 and the second fixed pulley 114 are part of a unitary structure 110 which is fixedly mounted so as not to rotate relative to the motor shaft 34 (e.g., fixed to surface 36). The centers of the fixed pulleys 52, 114 are aligned with the axis of the motor shaft, with the pulleys either concentric (as shown) or distal to the motor shaft 34.

The third planetary pulley 122 is coupled to the second fixed pulley 114 by drive belt 123. The fourth planetary pulley 124 is coupled to the first intermediary pulley 140 by drive belt 126. The first and second intermediary pulleys 140, 142 form a unitary structure 150 and move in unison. In one embodiment the unitary structure 150 is concentric to the first output shaft 26' between the first output shaft 26' and a surface 116. Bearing material or bearings are used to reduce friction during rotation of the structure 150. The second output pulley 54' is coupled to the second intermediary pulley 142 by drive belt 152. The second output shaft 26" is coupled to the second output pulley 54'. Note that the second output shaft 26" is offset relative to the axis 64 of motor shaft 34. In alternative embodiments both output shafts 26', 26" may be aligned with the axis 64 (e.g., concentric shafts 26', 26") or both may be offset from the axis 64.

In operation, the motor 32 spins the motor shaft 34, causing the mounting structure 38 to rotate with the motor shaft 34. As the mounting structure 38 rotates, the planetary pulleys 42, 44, 122, 124 rotate with the structure 38 orbiting about the motor shaft 34. Because the first planetary pulley 42 is coupled to the first fixed pulley 52 by drive belt 56, the first planetary pulley 42 is forced to rotate on axle 40 during its orbit. Similarly, because the third planetary pulley 122 is coupled to the second pulley 114 by drive belt 123, the third planetary pulley 122 rotates on axle 130 during its orbit. The fixed pulleys being stationary and not rotating, serve as a references for the rotation of the first and third planetary pulleys. Because the second planetary pulley 44 shares the same axle 40 as the first planetary pulley 42, the second planetary pulley 44 rotates with the first planetary pulley 42 as they orbit the motor shaft 34. Similarly, because the fourth planetary pulley 124 shares the same axle 130 as the third planetary pulley 122, the fourth planetary pulley 124 rotates with the third planetary pulley 122 as they orbit the motor shaft 34. Note that the third and fourth planetary pulleys 122, 124 serve as counterbalances to the first and second planetary pulleys 42, 44 and that the first and second planetary pulleys 42, 44 serve as counter-balances to the third and fourth planetary pulleys 122, 124.

Because the output pulley 54 is coupled to the second planetary pulley 44 by belt 58, it too is forced to rotate (see FIG. 3). The speed of rotation of the output pulley 54 is determined by the speed of rotation of the second planetary pulley 44 and the relative diameters of the second planetary pulley 44 and the output pulley 54. The first output shaft 26' is driven by the output pulley 54, either directly or indirectly. A fixed-differential, output drive of the first output shaft 26' is achieved based upon the selections of the diameters for the fixed pulley 52, the first planetary pulley 42, the second planetary pulley 44, and the output pulley 54. In the single stage implementation shown in FIG. 2, the motor shaft to output shaft turn ratio is defined by the equation given above for the embodiment of FIG. 2.

Because the first intermediary pulley 140 is coupled to the fourth planetary pulley 124 by belt 126, it too is forced to rotate. The second intermediary pulley 142 rotates with the first intermediary pulley 140. Because the output pulley 54' is coupled to the second intermediary pulley 142 by belt 152, it too is forced to rotate. The speed of rotation of the output pulley 54' is determined by the speed of rotation of the second intermediary pulley 142 and the relative diameters of the second intermediary pulley 142 and the output pulley 54'. The second output shaft 26" is driven by the output pulley 54', either directly or indirectly. A fixed-differential, output drive of the second output shaft 26" is achieved based upon the selections of the diameters for the fixed pulley 114, the third planetary pulley 122, the fourth planetary pulley 124, the first intermediary pulley 140, the second intermediary pulley 142, and the output pulley 54'.

Alternative Embodiment—Variable Differential Drive

An oscillatory motion may be generated on an output shaft of the described systems by implementing variable differentiation, rather than fixed differentiation at one of the drive stages. Note the equation given above for the system of FIG. 2. When the diameter of the fixed pulley 52 times the diameter of the second planetary pulley 44 equals the diameter of the first planetary pulley 42 times the diameter of the output pulley, the denominator equals zero. This corresponds to a condition in which the motor shaft rotates but the output shaft is stationary. If, a pulley is mounted off center, so that its effective diameter (distance from movement axis) changes during the rotation of the motor shaft, then the motor to output shaft, drive ratio changes over time. The result is a variable differential drive system.

For a system in which the differential drive ratio varies periodically over time, the speed of the output shaft will vary periodically over time (i.e., oscillate). Specifically, the speed of the output shaft will oscillate about a prescribed speed, (speed=N±X, where N is the center speed and X is the variation in speed. For example, in one embodiment, the center speed, N, is zero and the speed of the output shaft will vary from −X to +X. In effect the direction which the output shaft spins will vary according to whether the speed is positive or negative. In another embodiment, the center speed is non-zero and the speed of the output shaft will vary from N−X to N+X.

For the embodiment in which N=0, the pair of planetary pulleys, the fixed pulley and the output pulley are the same size. To achieve a variable-differential drive ratio, two of such four pulleys are eccentrically mounted. For embodiments in which the drive belt is to be a fixed length during rotation of the pulleys, the two pulleys eccentrically mounted are coupled by a common drive belt.

Figure 11:
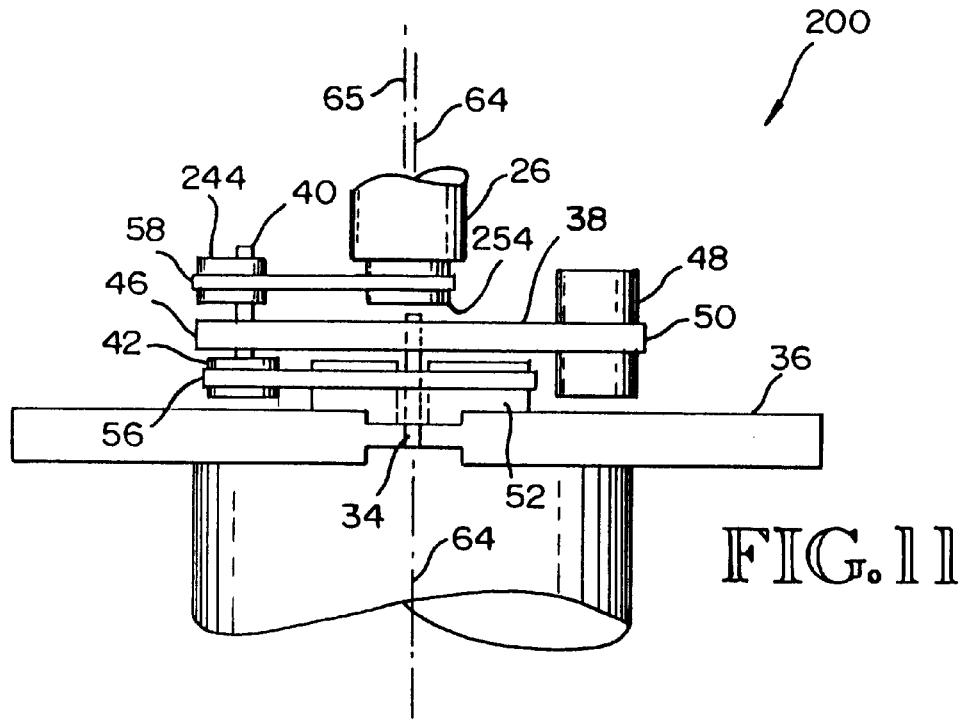
FIG. 11 is a diagram of a variable-differential, planetary, belt drive system according to an embodiment of this invention.

Referring to FIG. 11, a variable-differential belt drive system 200 includes a pair of planetary pulleys 42, 244, a fixed pulley 52 and an output pulley 254. Like components compared to the system 30 of FIG. 2 are given the same part numbers and perform the same functions. Note that the planetary pulley 244 is mounted off-center relative to axle 40, and the output pulley 254 is off-center relative to the axis 64 of the fixed pulley. Output pulley 254 is coupled to planetary pulley 244 by drive belt 58. Also note that planetary pulley 42 is concentrically mounted relative to axle 40 and that fixed pulley 52 is concentrically mounted relative to axis 64. By concentrically mounted it is meant that the center point of pulley 42 is aligned with axle 40, and the center point of pulley 52 is aligned with axis 64.

As the planetary pulleys orbit around the motor shaft 34, the circumferential portion of the pulley 244 most distant from the drive shaft 34 varies periodically with time, while that of pulley 42 stays constant with time. Twice the distance from such center point of pulley 244 to the axle 40 is the diameter of interest at a given time. Note that such diameter will vary periodically with time. Similarly, the circumferential portion of the output pulley 254 most distant from the planetary pulley 244 varies periodically with time. Twice the distance from such center point of output pulley 254 to the axis 64 is the diameter of interest for the output pulley 254 at a given time. Note that such diameter will vary periodically with time. The equation for the differential drive ratio between the motor shaft 34 and the output shaft 26 for the embodiment of FIG. 11 is given below:

$$\frac{1}{1 - ((d_{fp} * d_{spp}(t))/(d_{fpp} * d_{op}(t)))}$$

where, $d_{fp}$=diameter of the fixed pulley;
$d_{spp}$ (t)=effective diameter of the second planetary pulley at time t;
=twice the distance from the axle 40 to most distant circumferential portion of pulley relative to motor shaft at time t;

$d_{fpp}$ diameter of the first planetary pulley;

$d_{op}(t)$=effective diameter of the output pulley at time t;

=twice the distance from motor shaft axis 64 to the center point of the circumferential arc portion of the output pulley engaged by the belt 58 at time t.

The differential drive ratio is varying during the orbiting of the planetary pulleys 42, 244 about the motor shaft 34 due to the eccentric mounting of pulleys 244, 254. In particular, the denominator in the equation above varies from a negative value through zero to a positive value. This corresponds to an output shaft motion in which the output shaft 26 rotates in a first direction, slows down to a stop, reverses direction to an opposite second direction and speeds up, then slows down again to a stop and changes direction back to the first direction of rotation and speeds up. The cycle repeats periodically based upon the motor shaft speed.

Figure 12:
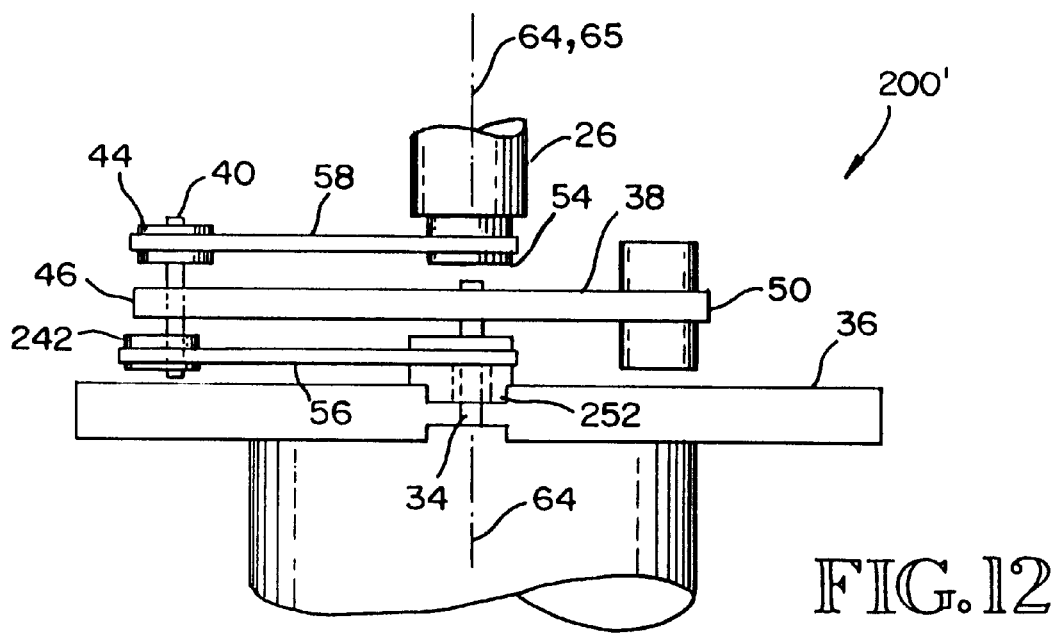
FIG. 12 is a diagram of a variable-differential, planetary, belt drive system according to another embodiment of this invention.

Referring to FIG. 12, another variable-differential belt drive system 200' is shown, including a pair of planetary pulleys 242, 44, a fixed pulley 252 and an output pulley 54. Like components compared to the system 30 of FIG. 2 are given the same part numbers and perform the same functions. In this embodiment, rather than eccentrically mount the output pulley 54 and the second planetary pulley 44, the first planetary pulley 242 and fixed pulley 252 are eccentrically mounted. Note that the fixed pulley 252 is mounted so that its center point is off-center relative to the motor shaft axis 64. In addition, the first planetary pulley 242 is mounted so that its center point is off-center relative to its axle 40. The planetary pulley 242 and fixed pulley 252 share a drive belt 46. As the planetary pulley 242 orbits around the fixed pulley 252 while the motor shaft 34 spins, the circumferential portions of the fixed pulley 252 and first planetary pulley 242 engaged by the belt 56 vary. The center of the fixed pulley 252 circumferential arc relative to the motor shaft axis 64 is of interest. Twice the distance from such arc center point of pulley 252 to the axis 64 is the diameter of interest at a given time. Note that such diameter will vary periodically with time. Such varying diameter is the fixed pulley diameter plugged into the drive ratio equation. Similarly, the center of the first planetary pulley 242 circumferential arc relative to the axle 40 is of interest. Twice the distance from such arc center point of pulley 242 to the axle 40 is the diameter of interest at a given time. Note that such diameter will vary periodically with time. Such varying diameter is the first planetary pulley 242 diameter plugged into the drive ratio equation. The equation for the differential drive ratio between the motor shaft 34 and the output shaft 26 is given below:

$$\frac{1}{1 - ((d_{fp}(t) * d_{spp}) / (d_{fpp}(t) * d_{op}))}$$

where, $d_{fp}(t)$=effective diameter of the fixed pulley at time t;

=twice the distance from motor shaft axis 64 to the center point of the circumferential arc portion of the fixed pulley engaged by the belt 56 at time t;

$d_{spp}$=diameter of the second planetary pulley;

$d_{fpp}(t)$=effective diameter of the first planetary pulley at time t;

=twice the distance from the axle 40 to most distant circumferential portion of pulley relative to motor shaft at time t;

$d_{op}$=diameter of the output pulley.

The differential drive ratio is varying during the orbiting of the planetary pulleys 242, 44 about the motor shaft 34 due to the eccentric mounting of the fixed pulley 252 and the first planetary pulley 242. In particular, the denominator in the equation above varies from a negative value through zero to a positive value. This corresponds to an output shaft motion in which the output shaft 26 rotates in a first direction, slows down to a stop, reverses direction to an opposite second direction and speeds up, then slows down again to a stop and changes direction back to the first direction of rotation and speeds up. The cycle repeats periodically based upon the motor shaft speed.

In other embodiments, multiple stages may be implemented. In one of the stages pulleys are eccentrically mounted to achieve a variable differential drive ratio which varies over time.

Meritorious and Advantageous Effects

One advantage of the invention is that large and versatile drive differentiation of the output shaft is achieved. Specifically, a large differential ratio is achieved between the motor shaft and the output shaft in as little as one stage. In the example described above a differential ratio of over 200:1 is achieved in one stage. This is a significant advantage over, for example, a non-planetary belt drive system which achieves about a 5:1 gear ratio per stage.

Further, a versatile drive differential ratio may be achieved using the drive belts. In the belt drive system of this invention, the size of the pulleys or the number of teeth in a timing belt may be changed with little restriction (compared to the pitch diameter limitation of a planetary gear system). As a result, systems can be implemented according to the invention having a wide range of differential ratios. In the example described above, any differential ratio between −224:1 to +225:1 may be achieved. The specific ratios are cited just for example and may span a smaller or larger range in other examples. Accordingly, there are more differential drive ratio possibilities in the system of this invention, compared to gear ratio possibilities in a planetary gear system of the same number of stages. Versatile drive differentiation of the output shaft is achieved while maintaining accurate media advance at increasingly faster throughput speeds.

Another advantage of the invention is that the rotating pulleys and drive belts make less noise than meshing gears. As a result, system acoustical noise levels are reduced. System acoustical noise level is further reduced by the damping effect of the drive belt on motor vibrations and noise. Rather than have the motor vibrations and noise translated through gears into the drive mechanisms, the drive belt provides a degree of isolation. The isolation is further effected by isolating the motor from the system chassis using an isolation surface (e.g., surface 36).

An advantage of the oscillatory output system is that rapid acceleration and varying direction are achieved without engagement and disengagement of a gear train. This invention reduces system noise and drive system wear.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A system for acting upon a media sheet, the system comprising:

an activity source device;

a media roller for advancing the media sheet to the activity source device;

a motor having a motor shaft, the motor spinning the motor shaft, the motor shaft defining a motor shaft axis;

a mount secured to the motor shaft, the mount rotating with the spinning motor shaft;

a first planetary pulley and a second planetary pulley coupled to the mount to move in unison, the first and second planetary pulleys orbiting the motor shaft axis, the first planetary pulley having a first diameter, the second planetary pulley having a second diameter;

a fixed pulley centered along the axis of the motor shaft, the fixed pulley being stationary, the fixed pulley having a third diameter;

a first drive belt coupling the first planetary pulley to the fixed pulley, causing the first planetary pulley to rotate about a first pulley axis while orbiting the motor shaft axis, the second planetary pulley, moving in unison with the first planetary pulley, rotating about a second pulley axis while orbiting the motor shaft axis;

an output pulley coupled to the second planetary pulley, the output pulley rotating about an output pulley axis in response to the rotation of the second planetary pulley, the output pulley having a fourth diameter; and an output shaft driven by the output pulley, the media roller driven by the output shaft.

2. The system of claim 1, in which the activity source device comprises a print recording apparatus.

3. The system of claim 1, in which the activity source device comprises a media scanning apparatus.

4. The system of claim 1, further comprising a second drive belt which couples the output pulley to the second planetary pulley, the output shaft having a fixed differential drive ratio relative to the motor shaft which is based upon the first diameter, second diameter, third diameter, and fourth diameter.

5. The system of claim 1, in which the output pulley has an output pulley axis which is coincident with the motor shaft axis.

6. The system of claim 1, in which the output pulley has an output pulley axis which is offset from the motor shaft axis.

7. The system of claim 1, further comprising a counter-balance, and in which the mount is elongated having a first end toward which are mounted the first planetary pulley and the second planetary pulley and a second end toward which is mounted the counter-balance.

8. The system of claim 1, in which the fixed pulley is mounted concentric to the motor shaft.

9. The system of claim 1, in which the fixed pulley is mounted distal to the motor shaft.

10. The system of claim 1, further comprising, a first intermediary pulley and a second intermediary pulley which rotate in unison, the first intermediary pulley having a fifth diameter, the second intermediary pulley having a sixth diameter;

a second drive belt coupling the second planetary pulley to the first intermediary pulley;

a third drive belt coupling the output pulley to the second planetary pulley;

the output shaft having a fixed differential drive ratio relative to the motor shaft which is based upon the first diameter, second diameter, third diameter, fourth diameter, fifth diameter and sixth diameter.

11. The system of claim 10, in which the first intermediary pulley and the second intermediary pulley are mounted concentric to the fixed pulley and have a common intermediary pulley axis which is coincident with the motor shaft axis.

12. The system of claim 1, further comprising a counter-balance coupled to the mount at a second location, the counter-balance balancing a moment arm acting upon the motor shaft during the rotation of the mount with the spinning motor shaft.

13. The system of claim 12, in which the counter-balance comprises a third planetary pulley and a fourth planetary pulley, the third planetary pulley having a fifth diameter, the fourth planetary pulley having a sixth diameter.

14. The system of claim 13, in which the fixed pulley is a first fixed pulley, the output pulley is a first output pulley, and the output shaft is a first output shaft, and further comprising:

a second fixed pulley centered along the axis of the motor shaft, the second fixed pulley being stationary, the second fixed pulley having a seventh diameter;

a second output pulley coupled to the fourth planetary pulley, the second output pulley having an eighth diameter;

a second drive belt coupling the third planetary pulley to the second fixed pulley; and a second output shaft driven by the second output pulley, the second output shaft having a fixed differential drive ratio relative to the motor shaft which is based at least in part upon the fifth diameter, sixth diameter, seventh diameter, and eighth diameter.

15. The system of claim 14, in which the second output pulley is indirectly coupled to the fourth planetary pulley, and further comprising:

a first intermediary pulley and a second intermediary pulley which rotate in unison, the first intermediary pulley having a ninth diameter, the second intermediary pulley having a tenth diameter;

a third drive belt coupling the first intermediary pulley to the fourth planetary pulley;

the second output shaft fixed differential drive ratio relative to the motor shaft which being based at least in part upon the fifth diameter, sixth diameter, seventh diameter, eighth diameter, ninth diameter and tenth diameter.

16. The system of claim 15, in which the first intermediary pulley and the second intermediary pulley are mounted concentric to the first output shaft.

17. A belt drive apparatus, comprising:

an input drive shaft defining an input drive shaft axis, the input drive shaft spinning;

a mount secured to the input drive shaft, the mount rotating with the spinning input drive shaft;

a first planetary pulley and a second planetary pulley coupled to the mount to move in unison, the first and second planetary pulleys orbiting the input drive shaft axis, the first planetary pulley having a first diameter, the second planetary pulley having a second diameter;

a fixed pulley intersecting the input drive shaft axis, the fixed pulley being stationary, the fixed pulley having a third diameter;

a first drive belt coupling the first planetary pulley to the fixed pulley, causing the first planetary pulley to rotate about a first pulley axis while orbiting the input drive shaft axis, the second planetary pulley, moving in unison with the first planetary pulley, rotating about a second pulley axis while orbiting the input drive shaft axis;

an output pulley coupled to the second planetary pulley, the output pulley rotating about an output pulley axis in response to the rotation of the second planetary pulley, the output pulley having a fourth diameter; and an output shaft driven by the output pulley.

18. The apparatus of claim 17, further comprising a motor having a motor shaft, the motor spinning the motor shaft, the motor shaft being the input drive shaft.

19. The apparatus of claim 17, in which first planetary pulley, second planetary pulley and fixed pulley comprise a first drive differential stage, and in which the output pulley is indirectly coupled to the second planetary pulley by a second drive differential stage, the second differential drive stage comprising a pair of intermediary pulleys and a second drive belt.

20. The apparatus of claim 17, in which the fixed pulley is centered along the axis of the motor shaft.

21. The apparatus of claim 17, wherein a pulley axle couples the first planetary pulley and second planetary pulley to the mount, the first planetary pulley eccentrically mounted on the pulley axle, wherein the fixed pulley has a center point, the center point being out of alignment with the axis of the motor shaft, and wherein while the motor shaft is rotating at a first speed, a speed of the output shaft oscillates.

22. The apparatus of claim 17, wherein a pulley axle couples the first planetary pulley and second planetary pulley to the mount, the second planetary pulley eccentrically mounted on the pulley axle, and in which the output pulley axis is out of alignment with the axis of the motor shaft, and wherein while the motor shaft is rotating at a first speed, a speed of the output shaft oscillates.

23. A method for reducing acoustic noise level of a media advance system which includes a drive motor having a spinning motor shaft and at mount fixed to the motor shaft which rotates with the spinning motor shaft, the method comprising the steps of:

securing a first planetary pulley and a second planetary pulley to the mount, the first planetary pulley and second planetary pulley moving in unison;

coupling the first planetary pulley to a fixed pulley using a first drive belt, the fixed pulley having a center point which is coincident with an axis of the motor shaft; and coupling the second planetary pulley to an output pulley with a second drive belt, the output pulley driving an output shaft which in turn drives a media roller which advances a media sheet, wherein reduced acoustic noise level is achieved by using drive belts.

24. The method of claim 23, in which the second planetary pulley is indirectly coupled to the output pulley, the step of coupling the second planetary pulley to the output pulley comprising the steps of:

directly coupling the second planetary pulley to a first intermediary pulley with the second drive belt;

coupling a second intermediary pulley to the output pulley with a third drive belt, wherein the first intermediary pulley and the second intermediary pulley move in unison.

* * * * *